Patented July 26, 1927.

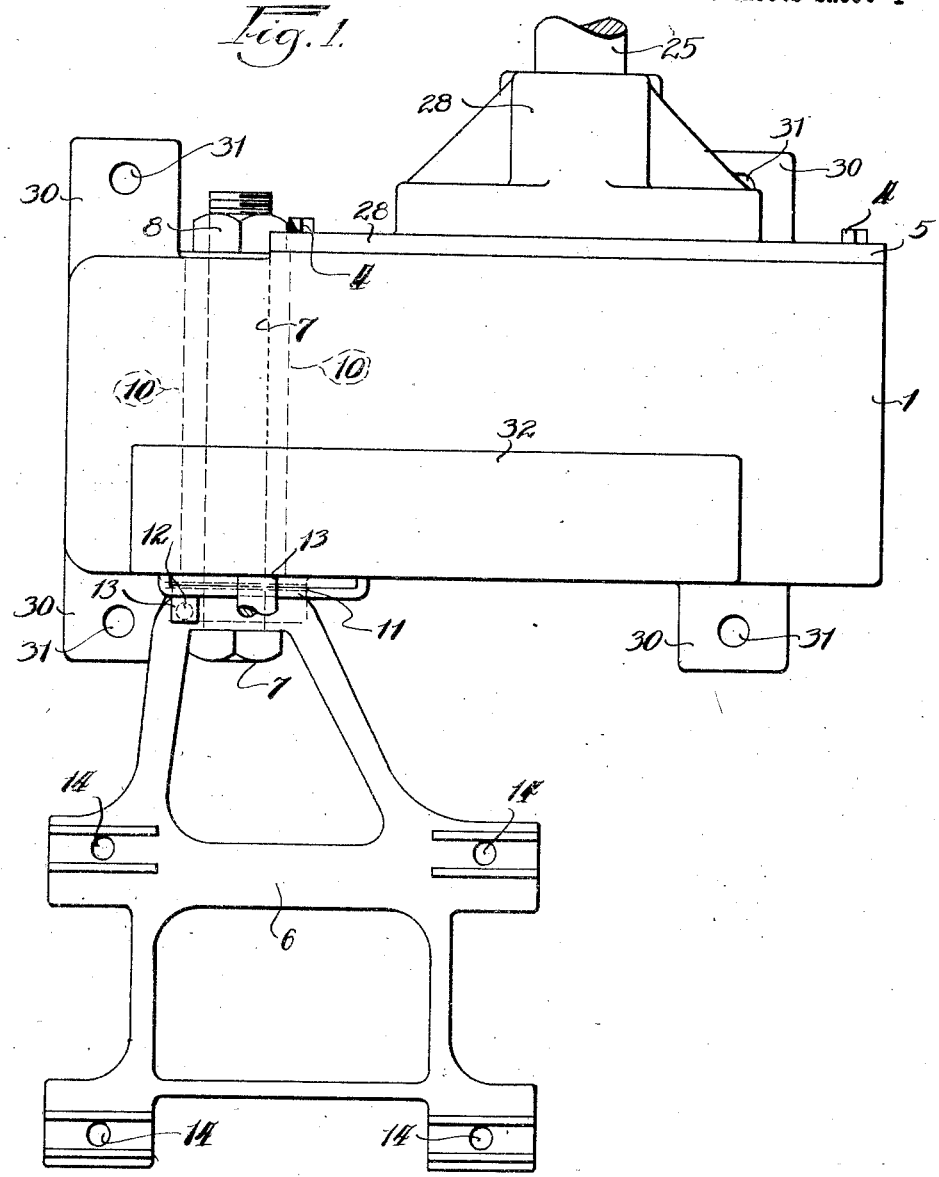

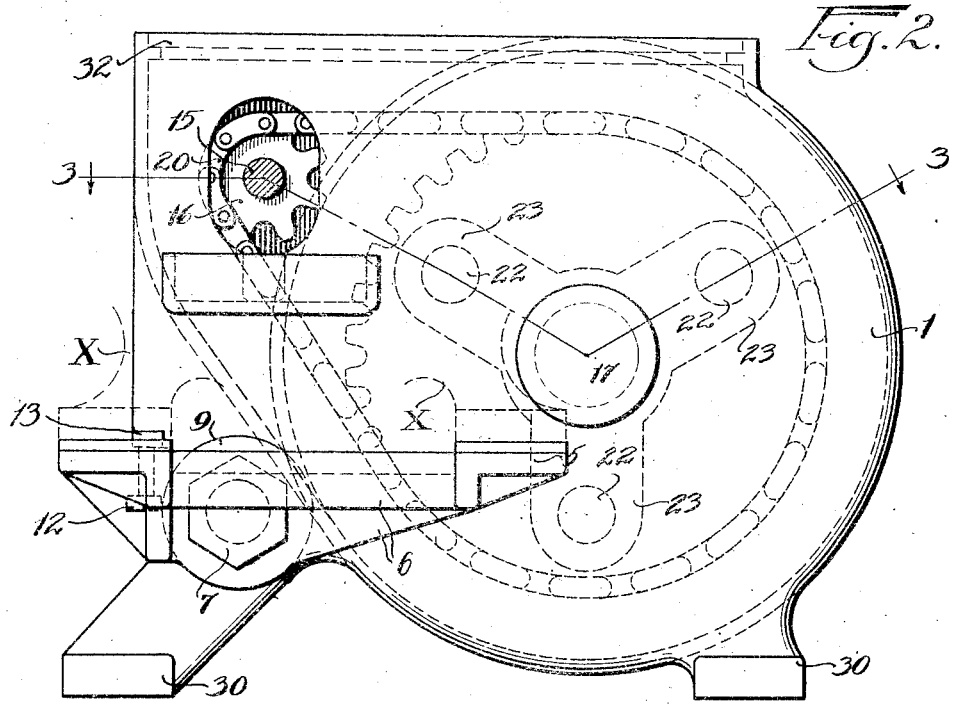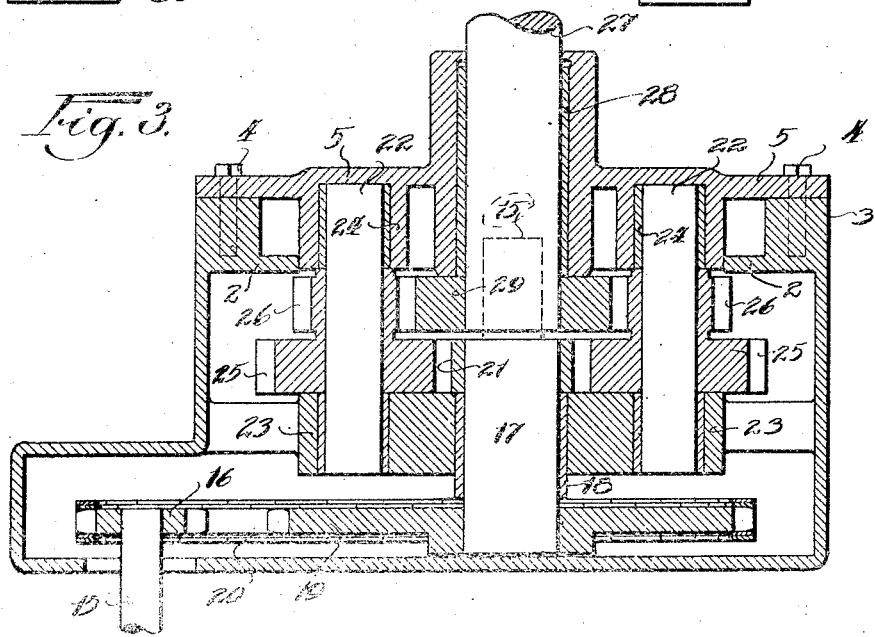

1,637,106

UNITED STATES PATENT OFFICE.

OTTO CULLMAN, OF CHICAGO, ILLINOIS.

ELECTRIC LOW-SPEED UNIT.

Application filed August 4, 1926. Serial No. 127,074.

This invention relates to a device that reduces or steps down the high speed of electric motors to the speed required for machines or for special purposes.

Among the objects of the invention is to obtain an efficient, economical, durable and compact machine which can be mounted direct on machines or machine tools. An additional object is to obtain a device of the kind named which can be mounted on the floor. An additional object is to obtain an electric low speed unit adapted to be associated with an electric motor in such manner as to permit perfect adjustment between the unit and the motor, and at the same time to allow the motor to be removed without disturbing any mechanical connections of the driven shaft of the unit. A further object is to obtain an electric low speed unit in which all the gears, sprockets, chains and bearings will be automatically oiled, so long as a determined quantity of oil is contained in the housing or shell of the device.

I have illustrated an electric low speed unit in the drawings referred to, in which Fig. 1 is a top plan view of the housing of the device and of the motor table associated therewith.

Fig. 2 is an end elevation of said housing and table, with an electric motor indicated by broken lines on said table; and Fig. 3 is a horizontal section of the device, on line 3—3 of Fig. 2, viewed as indicated by arrows.

A reference character applied to designate a given part indicates said part throughout the several figures of the drawing wherever the same appears.

1 represents the housing of the unit. 2 represents an inwardly extending annular flange at the open end of the housing. The housing, being provided with said flange 2 is adapted to contain a considerable quantity of oil when the end (5) is not in place, and the lubrication of the several movable parts of the device contained in the housing is thus provided for. 3 represents an annular flange which is provided with screw threaded apertures to receive bolts 4. 5 represents a separable end to housing 1, which is secured in place by bolts 4. 6 represents an adjustable table adapted to form a base for an electric motor, said motor being indicated by broken lines X, (Fig. 2), as mounted thereon. 7 represents a bolt on which the table 6 is mounted and by means of which it is rigidly attached to housing 1. 8 represents a nut on bolt 7, and 9 an extension of the housing, in which extension an aperture, (indicated by broken lines 10, Fig. 1), is provided through which bolt 7 is extended. The table 6 is pivotally mounted on said bolt 7, and may be adjusted longitudinally thereon by interposing a suitable number of washers 11, thereon, between the end of table 6 and said housing. When said table is longitudinally and rotatably adjusted on bolt 7 it is rigidly secured in its adjusted position by said nut 8 being turned tightly to place. To avoid any possible turning of said table on said bolt the set screw 12 is provided which extends through a screw threaded aperture provided therefor adjacent to one end of table 6 with the end thereof "set" against the under side of abutment 13, on the housing. Table 6 is provided with screw threaded apertures 14, (Fig. 1), into which bolts, to secure the electric motor placed thereon rigidly in place, extend. 15 represents a shaft of an electric motor and 16, (Figs. 2 and 3), a sprocket pinion which is rigidly secured on said shaft to turn therewith. 17 represents a shaft which is rotatably mounted in journal bearings 18, and 19 a sprocket wheel which is rigidly mounted on shaft 17. 20 represents a sprocket chain which extends over sprocket pinion 16 and sprocket wheel 19. The sprocket pinion 16 is adjustable in line with sprocket wheel 19 by interposing said washers 11 between the table 5 and the housing 1, said washers being mounted on bolt 7; and said sprocket pinion is moved to obtain suitable tension on sprocket chain 20 by turning said table on said bolt before the nut 8 and the set screw 12 are turned into position, to hold said table rigidly in place. 21 represents a gear pinion which is rigidly secured on shaft 17. 22 represents shafts which are rotatably mounted in journal bearings 23, 24. 25 represents gear wheels which are, respectively, rigidly secured on a shaft 22, so that the gear teeth thereof mesh with the teeth of gear pinion 21. 26 represents gear pinions which are rigidly mounted on shafts 22, respectively. 27 represents a shaft which is rotatably mounted in journal bearings 28; and 29 represents a gear wheel which is rigidly mounted on shaft 27. Shafts 22 are arranged relative to the shaft 27 so that the several gear pinions 26 are in mesh with the gear wheel 29. The housing 1 is provided with the feet or lugs 30, having apertures 31, through which bolts may be extended to secure the said housing in a predetermined position.

32 represents a removable cover placed over an aperture on the top of the housing, through which lubricant, as oil, may be poured into the housing, as required.

I claim:

1. A housing, a plurality of central shafts rotatably journaled in said housing, a plurality of additional shafts rotatably journaled in said housing, a sprocket wheel and a gear pinion rigidly mounted on one of said central shafts, gear wheels and gear pinions rigidly mounted on said additional shafts, said gear wheels arranged to mesh with said gear pinion, a gear wheel rigidly mounted on the remaining one of said central shafts and arranged to mesh with the gear pinions on said additional shafts, in combination with a motor shaft arranged to extend into said housing, a sprocket pinion rigidly mounted on said motor shaft, a sprocket chain arranged to connect said sprocket pinion and said sprocket wheel, and means to adjust said sprocket pinion laterally and means to adjust it to a determined distance from said sprocket wheel.

2. A housing, a plurality of central shafts rotatably journaled in said housing, reducing gears mounted on shafts in said housing, a sprocket wheel rigidly mounted on one of said central shafts, all in combination with a motor shaft extending into said housing, a sprocket pinion rigidly mounted on said motor shaft, and a sprocket chain connecting said sprocket pinion and said sprocket wheel, means to adjust said sprocket pinion laterally and means to adjust it to a determined distance from said sprocket wheel.

3. A housing provided with an open end and with an inwardly extending annular flange at said open end, in combination with a cover adapted to close said open end, said cover provided with annular flanges on said cover arranged to form journal bearings for a plurality of rotatable shafts, and with apertures adjacent to its peripheral edge, said housing provided with an additional annular flange (3), provided with screw threaded holes, and bolts adapted to extend through said apertures in said cover and into said screw threaded holes.

4. A housing provided with an open end and with an inwardly extending annular flange adjacent to said open end, and journal bearings in said housing, in combination with a cover adapted to close said open end, and annular flanges on said cover arranged to form a plurality of journal bearings, said cover provided with apertures adjacent to its peripheral edge, said housing provided with an additional annular flange (3), and said flange provided with screw threaded holes, and bolts adapted to extend through said apertures in said cover and into said screw threaded holes.

OTTO CULLMAN.